May 7, 1940.   F. H. NICHOLSON   2,200,188
RAILWAY SIGNALING APPARATUS
Filed Sept. 18, 1939
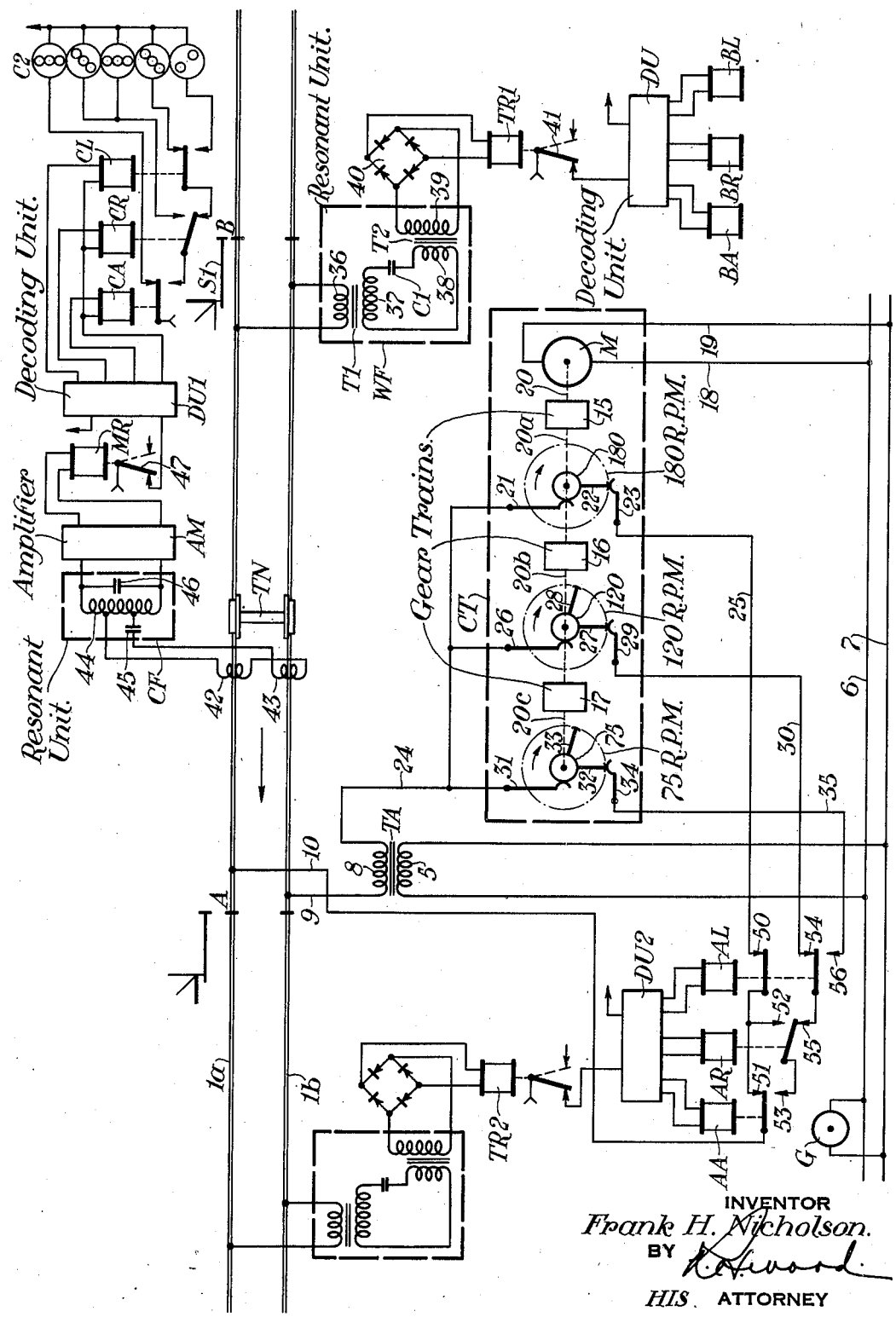
INVENTOR
Frank H. Nicholson.
BY 
HIS ATTORNEY Patented May 7, 1940

2,200,188

UNITED STATES PATENT OFFICE 2,200,188

RAILWAY SIGNALING APPARATUS

Frank H. Nicholson, Penn Township, Allegheny County, Pa., assignor to The Union Switch & Signal Company, Swissvale, Pa., a corporation of Pennsylvania Application September 18, 1939, Serial No. 295,398

12 Claims. (Cl. 246—63)

My invention relates to railway signaling apparatus, and particularly to apparatus of this character for supplying coded current to the rails of a track section.

In railway signaling coded alternating current is used for track circuits for controlling either wayside or cab signal apparatus or both. Alternating current of a desired frequency such as, for example, 100 cycles per second, is periodically interrupted or coded at different rates in response to different traffic conditions, the code rates of 180, 120 and 75 cycles per minute being those in general use. Each cycle period of such coded current is divided into substantially equal "on" and "off" periods. For example under the 180 code rate each cycle period is of one-third second duration and current flows ("on" period) for substantially one-sixth second, and no current flows ("off" period) for substantially one-sixth second. A code following track relay is coupled with the track rails through a receiving circuit which preferably includes a resonant unit having inductance and capacitance tuned to resonance at the frequency of the alternating current. Thus in the case here used for illustration, such resonant unit is tuned to resonance at 100 cycles per second. Preferably a rectifier is employed and the code following relay is a direct current type of relay operated to one position when current flows in the track circuit and operated to a second position when the current is interrupted. Consequently such code following track relay is operated to its two respective positions for substantially equal periods because the coded track circuit current has substantially equal "on" and "off" periods. That is, the track relay has substantially equal "on" and "off" operation periods. The decoding apparatus selectively governed by the code following relay for controlling a wayside signal or other apparatus in accordance with the different code rates is constructed for most satisfactory operation when the code following relay is operated with substantially equal "on" and "off" periods.

Again, when cab signals are controlled by such coded alternating current a receiving unit is mounted on the train in inductive relation with the track rails to inductively receive an electromotive force each period alternating current flows in the rails. This train carried receiving circuit preferably includes a resonant unit tuned to resonance at the frequency of the alternating current. The electromotive force induced in this train carried receiving circuit is applied to a code following relay in such manner that the relay is operated with substantially equal "on" and "off" periods because of the equal "on" and "off" periods of the track circuit current. The train carried relay by such operation controls the cab signal and other equipment through a decoding unit of a construction which gives most satisfactory operation when equal "on" and "off" operation periods of the code following relay are effected.

Railway track circuits which use recurrent or time spaced impulses of direct current of relatively high peak voltage have been proposed as an aid to the shunting sensitivity of the track circuit. Such high voltages tend toward an excessive energy output from the direct current source and hence it has been further proposed to make the individual current impulses of short duration as compared with the duration between successive impulses so that the energy output from the current source is relatively small.

Accordingly a feature of my present invention is the provision of novel and improved means wherewith code impulses of alternating current of different code rates or frequencies are provided for a track circuit with the current impulses of high peak voltage as an aid to the shunting sensitivity of the track circuit and with each current impulse of short duration as compared to the duration between successive current impulses so that the energy output from the current source is relatively small. Furthermore, the current impulses are effective to operate present standard code following relays with substantially equal "on" and "off" periods by shock exciting the associated resonant unit and decoding apparatus of the present highly efficient construction can be used. Other features and advantages of my invention will appear as the specification progresses.

I shall describe one form of apparatus embodying my invention, and shall then point out the novel features thereof in claims.

Referring to the accompanying drawing which is a diagrammatic view of a preferred form of apparatus embodying my invention, the reference characters $1a$ and $1b$ designate the track rails of a stretch of railway over which traffic normally moves in the direction indicated by an arrow and which rails are formed by the usual insulated rail joints into a series of consecutive track sections of a signal system, and of which sections only the one full section A—B is shown for the sake of simplicity. Each track section is provided with a track circuit including means for supplying coded alternating current across the rails at the exit end of the section and a code following track relay receiving energy from the rails adjacent the entrance end of the section. Energy is also received by apparatus mounted on a train when a train such as indicated conventionally at TN in the drawing occupies a track section.

The means for supplying coded current to the track circuit for section A—B includes a convenient source of alternating current, a track transformer TA and a code transmitter CT. The primary winding 5 of track transformer TA is connected across a line circuit including line wires 6 and 7 to which alternating current of any convenient frequency such as, for example, 100 cycles per second, is supplied by a generator G. It will be understood of course that my invention is not limited to alternating current of 100 cycles per second but that such frequency is used by way of illustration because of its general use in railway signaling. Alternating current of some other selected frequency can be used if desired. The secondary winding 8 of track transformer TA has one terminal connected with rail 1b of section A—B over wire 9 and its other terminal connected with rail 1a over wire 24, contacts of code transmitter CT as will shortly be explained, contacts of traffic controlled relays to be referred to, and wire 10.

The traffic controlled relays for governing the track circuit of section A—B include relays AA, AR and AL which are associated with the track circuit for the section next in advance of section A—B in a manner to be more fully explained hereinafter. At this point it is sufficient to point out that under clear traffic conditions for the section next in advance of section A—B, relays AA and AL are effectively energized and picked up and relay AR is released, under approach medium traffic conditions relays AR and AL are picked up and relay AA is released, under approach traffic conditions relay AL is picked up and relays AA and AR are released, and when the section next in advance is occupied all three relays AA, AR and AL are released.

The code transmitter CT may take different forms there being several well-known structures for such code transmitters. As here shown the code transmitter CT comprises three coding units 180, 120 and 75 which are driven from a motor M through gear trains. The motor M is connected across line wires 6 and 7 over wires 18 and 19 and hence is continually active to drive a shaft indicated conventionally by a dash line 20 at a predetermined rate. Gear train 15 is interposed between shaft 20 and a shaft 20a on the latter of which the coding unit 180 is secured, the gear train 15 being so proportioned that shaft 20a and coding unit 180 are rotated at a predetermined rate of, say, 180 revolutions per minute or 3 revolutions per second. A gear train 16 is interposed between shaft 20a and a shaft 20b on the latter of which coding unit 120 is secured, and gear train 16 is proportioned for shaft 20b and coding unit 120 to be rotated at a predetermined rate of, say, 120 revolutions per minute or 2 revolutions per second. In like manner a gear train 17 is interposed between shaft 20b and a shaft 20c on the latter of which coding unit 75 is secured, and gear train 17 is proportioned so that shaft 20c and coding unit 75 are rotated at a predetermined rate of, say, 75 revolutions per minute or 1¼ revolutions per second. It will be understood of course that the coding units may be driven at other rates if desired.

The coding unit 180 is constructed to continuously engage a contact spring 21 and include a rotatable contact member 22 adaptable of engaging a stationary contact spring 23 once each revolution, the parts being so proportioned that the contact 22—23 is closed for an interval substantially equal to one cycle of the alternating current supplied by generator G. That is to say, when the alternating current supplied by generator G is of 100 cycles per second, the contact member 22 engages contact spring 23 for onehundredth of a second each revolution. The coding unit 180 and its associated contact springs are interposed between the secondary winding 8 of track transformer TA and rail 1a under clear and under approach medium traffic conditions in advance of section A—B, the connection being traced from the right-hand terminal of secondary winding 8 over wire 24, contact spring 21, contact member 22 of coding unit 180, contact spring 23, wire 25, front contact 50 of relay AL, either front contact 51 of relay AA or front contact 52 of relay AR and back contact 53 of relay AA and thence over wire 10 to rail 1a.

Hence coding unit 180 which makes 180 revolutions per minute divides time into operation cycles the period of each of which operation cycle corresponds to the cycle period of the usual 180 code rate for coded alternating current, the first half of each revolution of coding unit 180 corresponding to the usual "on" period of the 180 code and the second half revolution corresponding to the usual "off" period of such code. With relays AA, AR and AL set to reflect either clear traffic conditions or approach medium traffic conditions in advance of section A—B and coding unit 180 interposed in the connection of secondary winding 8 with the track rails as described hereinbefore, a single cycle of the alternating current is supplied to the track rails at the start of each revolution or operation cycle of coding unit 180 due to contact member 22 engaging contact spring 23. That is to say, the coded alternating current supplied over coding unit 180 is of the 180 code rate with each current impulse consisting of substantially a single cycle of the alternating current supplied by the generator G, and this single cycle of alternating current is supplied at the start of each "on" period of the code cycle.

The turn ratio of the windings of transformer TA is such that the voltage delivered by secondary winding 8 to the track rails is preferably relatively high and thus each individual current impulse of the 180 code rate is characterized by a high peak voltage as an aid to the shunting sensitivity for the track circuit. Since each current impulse consists of but a single cycle of the alternating current such current impulses are of short duration as compared with the duration between successive current impulses and the energy output required from the current source is low. The manner whereby such coded alternating current effectively influences a code following relay will be taken up later on in the specification.

The coding unit 120 is constructed so as to continuously engage a contact spring 26 and the unit includes two rotatable contact members 27 and 28 each of which is adaptable of engaging a contact spring 29 during each revolution of the unit. The arc subtended by each contact member 27 and 28 is such that they each engage contact spring 29 for an interval equal to substantially one cycle of the alternating current supplied by generator G or for one-hundredth of a second. As here shown contact members 27 and 28 are spaced about 90° apart although this spacing can be varied some what as desired.

5. The coding unit 120 and its associated contact springs are interposed in the connection between secondary winding 8 and rail 1a under approach traffic conditions in advance of section A—B. This connection can be traced from right-hand terminal of secondary winding 8 over wire 24, contact spring 26, either contact member 27 or 28 of coding unit 120 in engagement with contact spring 29, wire 30, front contact 54 of relay AL, back contacts 55 and 53 of relays AR and AA, respectively, and wire 10 to rail 1a.

It follows that coding unit 120 which makes 120 revolutions per minute divides time into operation cycles the period of which corresponds to the cycle period of the usual 120 code rate for coded alternating current, the first half revolution of unit 120 corresponding to the usual "on" period of the 120 code and the second half revolution corresponding to the usual "off" period. With relays AA, AR and AL set to reflect approach traffic conditions in advance of section A—B and coding unit 120 interposed in the connection between transformer TA and the track rails of section A—B, a single cycle of alternating current is supplied to the track rails at the start of each "on" period of the code cycle period and another such current impulse is supplied later during the same "on" period. In other words two current impulses each of substantially one cycle of the alternating current are supplied to the track circuit each "on" period of the 120 code rate, the two current impulses being separated a predetermined interval.

Because of the turn ratio of transformer TA each of the two current impulses of the 120 code is of relatively high peak voltage as an aid to the shunting sensitivity for the track circuit, and since each current impulse is of short duration only a relatively low energy output from the current source is required.

Similarly the coding unit 75 is constructed to continuously engage a contact spring 31 and is provided with two rotatable contact members 32 and 33 which are spaced apart preferably about 90°. Each contact member 32 and 33 is adaptable of engaging a contact spring 34 once each revolution of the coding unit and the arc of each contact member is such that the contact 32—34 or 33—34 is closed for an interval equal to substantially one cycle of the alternating current supplied by generator G or is closed for substantially one-hundredth second. The coding unit 75 and its associated contact springs are interposed in the connection between secondary winding 8 and track rail 1a when the track section next in advance of section A—B is occupied and all three of the traffic controlled relays, AA, AR and AL are released. Such connection can be traced from the right-hand terminal of secondary winding 8 over twire 24, contact spring 31, either contact member 32 or 33 of coding unit 75, contact spring 34, wire 35, back contacts 56, 55 and 53 of relays AL, AR and AA, respectively, and wire 10 to rail 1a.

Consequently coding unit 75 which makes 75 revolutions per minute divides time into operation cycles the period of which corresponds to the cycle period of the usual 75 code rate for coded alternating current, the first half revolution of the coding unit corresponding to the usual "on" period of the 75 code and the second half revolution corresponding to the usual "off" period of the 75 code. Under approach traffic conditions for section A—B and coding unit 75 interposed in the connection between track transformer TA and the rails of section A—B, a single cycle of the alternating current is supplied to the track rails at the start of each "on" period of the code cycle period and a second single cycle of the alternating current is supplied later in the same "on" period. That is to say, two current impulses each of substantially one cycle of the alternating current are supplied to the track circuit each "on" period of the 75 code rate, the two impulses being spaced apart a predetermined interval.

Because of the turn ratio of transformer TA each of the two current impulses of the 75 code rate is of relatively high voltage and a high shunting sensitivity for the track circuit is provided with a relatively low energy output from the current source.

It is to be observed that with coding unit 180 as here constructed with but one contact member 22 a single current impulse of one cycle of the alternating current is supplied therethrough each code cycle period. It is clear, however, that coding unit 180 can be provided with two contact members spaced apart similar to the contact members of coding unit 120 or 75 if desired and two current impulses each of one cycle of the alternating current can be supplied to the track circuit each cycle period of the 180 code rate. Furthermore it is clear that each of the coding units can be provided with three contact members spaced apart and each constructed so as to engage the associated stationary contacts for an interval substantially equal to one cycle of the alternating current if desired so that three current impulses each of one cycle of the alternating current are supplied to the track circuit during each "on" period of the corresponding code rate. It is apparent also that the contact member of a coding unit can be constructed so that the current impulse transmitted therethrough consists of two or any selected number of cycles of the alternating current.

A code following track relay TR1 is controlled by the track circuit of section A—B through a receiving circuit which includes a resonant unit or filter WF. As here shown the resonant unit WF comprises two transformers T1 and T2 and a condenser C1. The primary winding 36 of transformer T1 is connected across the rails of section A—B and the secondary winding 37 of transformer T1 is connected with primary winding 38 of transformer T2 through condenser C1. The secondary winding 39 of transformer T2 is connected with the input terminals of a full wave rectifier 40 the output terminals of which are connected with the operating winding of relay TR1. The parts of resonant unit WF are so proportioned as to be tuned sharply to resonance at the frequency of the alternating current supplied to the track circuit and in the present case it is tuned to resonance at 100 cycles per second.

Code following relay TR1 controls over its contact member 41 the supply of current impulses to a decoding unit DU. Decoding unit DU would be constructed in the usual and well-known manner and is shown conventionally only for the sake of simplicity since its specific structure forms no part of my present invention. It is sufficient to say that when current impulses corresponding to the 180 code rate are supplied to the input terminals of decoding unit DU traffic controlled relays BA and BL connected with the output terminals of the decoding unit are effectively energized and picked up. When current impulses corresponding to the 120 code rate are supplied to unit DU relay BL and another traffic controlled relay BR also connected with the output side of unit DU are effectively energized and picked up. When current impulses corresponding to the code rate of 75 are supplied to the decoding unit relay BL only is effectively energized and picked up. When relay TR1 is inactive then all three of the traffic controlled relays BA, BR and BL are released. The relays BA, BR and BL are used to control the operating circuits (not shown) of a wayside signal S1 for governing traffic through section A—B. Such operating circuits would be in accordance with standard practice and form no part of my present invention. Relays BA, BR and BL are also used to control the supply of coded current to the track circuit of the section next in the rear of section A—B in the same manner the relays AA, AR and AL govern the supply of coded current to the track circuit of section A—B. Furthermore, it is to be observed the traffic controlled relays AA, AR and AL are governed by code following track relay TR2 and decoding unit DU2 associated with the track section next in advance of section A—B in the same manner that relays BA, BR and BL are governed by code following relay TR1 and decoding unit DU.

Assuming for the time being that the train TN is removed and does not occupy track section A—B and current impulses of the 180 code rate are supplied to the track circuit of section A—B in the manner explained hereinbefore, each current impulse of the code is effective to excite the receiving circuit including resonant unit WF. Since each current impulse is of relatively high voltage it is clear that the energy applied to the resonant unit serves to "shock" excite the unit so that oscillations are set up which persist in the resonant unit for some time after the current impulse ceases to flow in the rails. Due to such oscillations in the resonant unit WF an alternating electromotive force is applied to the input terminals of rectifier 40 and an impulse of unidirectional current of some duration is supplied to relay TR1 for operating that relay. It is clear that by proper proportioning of the parts each track circuit current impulse of the 180 code rate, and which impulse consists of substantially one cycle of alternating current of relatively high voltage, can be made to create oscillations that persist in the resonant unit WF for a period substantially equal to the usual "on" period of such 180 code rate and the resultant impulse of unidirectional current supplied to relay TR1 persists for a corresponding period. Hence under the 180 code rate code following track relay TR1 is operated with substantially equal "on" and "off" periods and the coding unit DU of standard construction is satisfactorily operated for controlling the associated traffic controlled relays.

When traffic conditions in advance of section A—B are such as to set up the 120 or 75 code rate for the track circuit of section A—B in the manner explained hereinbefore the interval the oscillations created in resonant unit WF in response to current impulse of a single cycle of the alternating current may not persist at an effective magnitude for the longer "on" period of the code rate, and hence the coding units 120 and 75 are constructed to cause two such current impulses to be supplied to the track circuit each "on" period of the respective code cycle period. The two current impulses are spaced apart so that when the oscillations caused in the resonant unit by the first current impulse begin to die out and fall below an effective value they are augmented by the oscillations created by the second current impulse and hence oscillations of an effective value continue for substantially the full "on" period of the code cycle and code following relay TR1 is operated at the corresponding code rate with substantially equal "on" and "off" periods.

The train TN which in the drawing is shown as occupying section A—B is equipped with cab signal apparatus which preferably would be of the standard construction in present day use and hence it is sufficient to describe such cab signal apparatus only insofar as required for a full understanding of my present invention.

The train TN is provided with a receiving circuit which includes two inductors 42 and 43 mounted on the train in inductive relation with the rails 1a and 1b, respectively, together with a filter or resonant unit CF. As here shown, the resonant unit CF comprises an inductance winding 44 and two condensers 45 and 46. Inductors 42 and 43 are connected across a portion of the inductance winding 44 through condenser 45 and condenser 46 is connected across the inductance winding 44, the full winding 44 in multiple with condenser 46 being connected with the input terminals of an amplifier AM. This resonant unit CF is preferably tuned sharply to resonance at the frequency of the alternating current applied to the track circuit and in the instant case here used for illustration the resonant unit CF is tuned to resonance at the frequency of 100 cycles per second.

A master code following relay MR is connected with the output terminals of amplifier AM and the arrangement is such that when an electromotive force of 100 cycles per second is induced in the receiving circuit relay MR operates its contact member 47 to a first position and when such electromotive force ceases the relay MR operates its contact member 47 to a second position. Relay MR controls over its contact member 47 the supply of current impulses to a decoding unit CU to the output terminal of which unit are connected three relays CA, CR and CL, the arrangement being such that when relay MR is operated at the 180 code rate relays CA and CL are picked up and relay CR is released, when relay MR is operated at the 120 code rate relays CR and CL are picked up and relay CA is released, when relay MR is operated at the 75 code rate relay CL is picked up and relays CA and CR are released, and when relay MR is inactive all three of the relays are released. Relays CA, CR and CL are used to control the operating circuits for a cab signal C2 in the well-known manner as will be readily understood from an inspection of the drawing.

In the event clear traffic conditions exist and the track rails of section A—B are supplied with coded current of the 180 code rate, each current impulse causes a surge of current through the train shunt which surge is of relatively high magnitude due to the high voltage of the current impulse with the result that the electromotive force induced in the train-carried circuit is of a correspondingly high energy level and serves to "shock" excite the resonant unit CF so that oscillations persist in the resonant unit for a period after the track circuit current impulse ceases. The oscillations thus created in resonant unit CF when applied to amplifier AM are effective to operate relay MR and relay MR is operated at substantially equal "on" and "off" operation periods due to the oscillations created by the one cycle of the alternating current flowing in the rails each "on" period of the 180 code rate. If traffic conditions are such that coded current of the 120 or 75 code rate is supplied to the track circuit of section A—B each current impulse is effective to excite the resonant unit CF so that oscillations persist therein after the current impulse ceases. Since under the 120 and 75 code rates two current impulses are supplied each "on" period of the code, when the oscillations created by the first current impulse begin to die away they are augmented by the oscillations created by the second impulse and relay MR is operated at substantially equal "on" and "off" operation periods.

It is to be seen therefore that the code impulses of alternating current of short duration and high voltage provided by apparatus embodying my invention are effective to operate the present day code following track relay and the present day train-carried code following relay with substantially equal "on" and "off" periods and decoding apparatus of standard construction can be employed.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In railway signaling apparatus including a receiving circuit coupled with the track rails of a track section and tuned to resonance at a predetermined frequency and which circuit is connected with decoding means for controlling a signaling device when time spaced electromotive forces of said predetermined frequency are applied to said receiving circuit at a particular code rate and each such electromotive force persists for a predetermined interval, the combination comprising, a source of alternating current of said predetermined frequency, a code transmitter having an operation cycle equal to the cycle period of said particular code rate and provided with a circuit closing means which is closed each operation cycle for an interval substantially equal to one cycle of said alternating current, and circuit means including said circuit closing means to connect said current source with the rails of said section for supplying to the rails each said operation cycle substantially one cycle of said alternating current at a relatively high voltage to apply to said receiving circuit an electromotive force which so excites said receiving circuit as to create oscillations that persist for said predetermined interval.

2. In railway signaling apparatus including a receiving circuit coupled with the track rails of a track section and tuned to resonance at a predetermined frequency and which circuit is connected with decoding means for controlling a signaling device when time spaced electromotive forces of said predetermined frequency are applied to said receiving circuit at a particular code rate and each such electromotive force persists for a predetermined interval, the combination comprising, a source of alternating current of said predetermined frequency, a code transmitter having an operation cycle equal to the cycle period of said particular code rate and provided with a circuit closing means which is closed at two selected points during the first half period of each operation cycle for an interval substantially equal to one cycle of said alternating current, and circuit means including said circuit closing means to connect said current source with the rails of said section for supplying to the rails two cycles of said alternating current which cycles are spaced apart and of relatively high voltage so as to apply to said receiving circuit two spaced electromotive forces which excite said receiving circuit so as to create oscillations that persist for said predetermined interval.

3. In railway signaling apparatus including a receiving circuit coupled with the track rails of a track section and tuned to resonance at a predetermined frequency and which circuit is connected with decoding means for controlling a signaling device when time spaced electromotive forces of said predetermined frequency are applied to said receiving circuit at a particular code rate and each such electromotive force persists for a predetermined interval, the combination comprising, a source of alternating current of said predetermined frequency, a code transmitter provided with a contact member having an operation cycle equal to the cycle period of said particular code rate and a contact which is closed by said member once each said operation cycle for an interval substantially equal to one cycle of said alternating current, and circuit means including said contact to connect said current source with the rails of said section for supplying to the rails each said operation cycle a current impulse consisting of substantially one cycle of said alternating current for creating in said receiving circuit an electromotive force effective to cause current oscillations to persist in said receiving circuit for said predetermined interval to effectively operate said decoding means.

4. In railway signaling apparatus including a receiving circuit coupled with the track rails of a track section and tuned to resonance at a predetermined frequency and which circuit is connected with decoding means for controlling a signaling device when time spaced electromotive forces of said predetermined frequency are applied to said receiving circuit at a particular code rate and each such electromotive force persists for a predetermined interval, the combination comprising, a source of alternating current of said predetermined frequency, a code transmitter provided with a contact member having an operation cycle equal to the cycle period of said particular code rate and a contact which is closed by said member at the start of each operation cycle and at a point mid-way during the first half period of each operation cycle and which contact is closed each time for an interval substantially equal to one cycle of said alternating current, and circuit means including said contact to connect said current source with the rails of said section for supplying to the rails each said operation cycle two spaced current impulses each of which consists of substantially one cycle of said alternating current for creating in said receiving circuit two spaced electromotive forces each of which is effective to cause current oscillations that persist for an interval after the respective current impulse ceases whereby said decoding means is effectively operated to control the signaling device.

5. In combination with a receiving circuit coupled with the track rails of a track section and including a resonant unit tuned to resonance at a predetermined frequency and which circuit is connected with decoding means for controlling a signaling device when time spaced electromotive forces of said predetermined frequency are applied to said receiving circuit at a particular code rate, a source of alternating current of said predetermined frequency, and circuit means including a code transmitter operative to divide time into successive intervals each of which is equal to the cycle period of said particular code rate and said code transmitter provided with a contact which is closed at the start of each said interval for a period substantially equal to one cycle of said alternating current to connect said current source to the rails of said section for supplying to the rails time spaced impulses of alternating current of substantially one cycle each and each of which impulses is effective to shock excite the resonant unit of said receiving circuit and create current oscillations which persist for a time sufficient to operate said decoding means and control said signaling device.

6. In combination with a receiving circuit coupled with the track rails of a track section and including a resonant unit tuned to resonance at a predetermined frequency and which circuit is connected with decoding means for controlling a signaling device when time spaced electromotive forces of said predetermined frequency are applied to said receiving circuit at a particular code rate and each such electromotive force continues for substantially one-half of the cycle period of that particular code rate, a source of alternating current of said predetermined frequency, a code transmitter including a contact member operated to divide time into successive operation intervals substantially equal to the cycle period of said particular code rate and a contact adapted to engage said contact member at the start of each of said operation intervals for a period that is short as compared to one-half of the interval, a transformer, and circuit means including said transformer and said contact to connect said current source with the rails of said section for supplying to the rails time spaced impulses of alternating current of said code rate with the individual impulses of short duration as compared with the duration between successive impulses and of a relatively high voltage to shock excite the resonant unit of said receiving circuit and cause current oscillations to persist therein for substantially one-half of said cycle period to operate the decoding means and control said signaling device.

7. In combination with a receiving circuit coupled with the track rails of a track section and including a resonant unit tuned to resonance at a predetermined frequency and which circuit is connected with decoding means for controlling a signaling device when time spaced electromotive forces of said predetermined frequency are applied to said receiving circuit at a particular code rate and each such electromotive force continues for substantially one-half of the cycle period of that particular code rate, a source of alternating current of said predetermined frequency, a track transformer having a primary winding connected with said current source, a code transmitter including a contact member having a cyclic movement the interval of which movement is equal to the cycle period of said particular code rate and a contact engaged by said member once each said movement for an interval substantially equal to one cycle of said alternating current, and circuit means including said contact and contact member to connect a secondary winding of said transformer with the rails of said section for supplying to the rails impulses of alternating current at said particular code rate with each individual impulse consisting of substantially a single cycle of the alternating current at relatively high voltage to shock excite the resonant unit of said receiving circuit and cause current oscillations that persist for a time substantially equal to one-half of the cycle period of said code rate and which oscillations are of a magnitude effective to operate the decoding means and control said signaling device.

8. In combination with a receiving circuit coupled with the track rails of a track section and including a resonant unit tuned to resonance at a predetermined frequency and which circuit is connected with decoding means for controlling a signaling device when time spaced electromotive forces of said predetermined frequency are applied to said receiving circuit at a particular code rate and each such electromotive force continues for substantially one-half of the cycle period of that particular code rate, a source of alternating current of said predetermined frequency, a track transformer having a primary winding connected with said current source, a code transmitter including two contact members rotated at a rate equal to said particular code rate and adapted to separately engage another contact at selected points of the first half of each rotation, said contact members and said other contact proportioned to engage for intervals substantially equal to one cycle of said alternating current, and circuit means including said contact members and said other contact to connect a secondary winding of said transformer with the rails of said section for supplying to the rails two separated one-cycle impulses of said alternating current during the first half of each rotation of said contact members, and each of said current impulses of relatively high voltage to shock excite the resonant unit of said receiving circuit to cause current oscillations that persist for a time interval substantially equal to one-half of the cycle period of said code rate for operating the decoding means and controlling said signal device.

9. In combination, a source of alternating current of a predetermined frequency, a code transmitter including a contact member having a cyclic operation which is repeated at a predetermined code rate and a contact adaptable of engaging said contact member at the start of each said cyclic operation for an interval substantially equal to one cycle of said alternating current, a receiving circuit including a resonant unit tuned to resonance at said predetermined frequency, decoding means selectively responsive when energized by current impulses of said predetermined code rate to control a signal, circuit means including said contact member and contact of the code transmitter to couple said current source with said receiving circuit to shock excite said resonant unit by the single cycle of alternating current passed during the interval said contact member engages said contact to create current oscillations that persist for a predetermined interval, and other circuit means to couple said receiving circuit with said decoding means for energizing said decoding means by such current oscillations.

10. In combination, a source of alternating current of a predetermined frequency, a code transmitter having a cyclic operation which is repeated at a predetermined code rate and including a contact which is closed at two selected points of the first half of each said cyclic operation for an interval substantially equal to one cycle of said alternating current, a receiving circuit including a resonant unit tuned to resonance at said predetermined frequency, decoding means selectively responsive when energized by current impulses of said predetermined code rate to control a signal, circuit means including said contact of the code transmitter to couple said current source with said receiving circuit to shock excite said resonant unit by the single cycle of alternating current passed each interval said contact is closed to create during the first half of each said operation cycle current oscillations that persist at an effective value for an interval substantially equal to one-half of such operation cycle, and other circuit means including a rectifier to couple said resonant unit with said decoding means to operate the decoding means and control said signal by the time spaced current impulses effected by such oscillations.

11. In combination, a track section, a source of alternating current of a predetermined frequency, a transformer having its primary winding receiving current from such source, a code transmitter provided with a first and a second coding unit which have operation cycle of the order of 180 and 120 cycles per minute respectively, a first contact for said first coding unit closed at the start of each operation cycle of said first coding unit for a period substantially equal to one cycle of said alternating current, a second contact for said second coding unit closed at the start and at approximately ninety degrees from the start of each operation cycle of said second coding unit for an interval substantially equal to one cycle of said alternating current, a first circuit including said first contact to connect a secondary winding of said transformer across the rails of said sections, a second circuit including said second contact to connect said secondary transformer winding across the rails of said section, and a selector to selectively control said first and second circuits.

12. In combination, a track section, a source of alternating current of a predetermined frequency, a transformer having a primary winding receiving current from said source, a code transmitter provided with a plurality of coding units each of which is operated at a distinctive operation cycle, a contact for each of said coding units closed at a plurality of selected points in a selected one-half period of the operation cycle of that coding unit with each interval the contact is closed substantially equal to one cycle of said alternating current, and circuit means including the contacts of said coding units and a selector to connect a secondary winding of said transformer across the rails of said section over any selected one of said contacts.

FRANK H. NICHOLSON.